United States Patent
Missotten et al.

(10) Patent No.: US 12,527,255 B2
(45) Date of Patent: Jan. 20, 2026

(54) THRESHING CONTROL SYSTEM

(71) Applicant: CNH Industrial America LLC, New Holland, PA (US)

(72) Inventors: Bart M.A. Missotten, Herent (BE); Arno Leenknegt, Hooglede (BE); Jasper Vanlerberghe, Aartrijke (BE); Frederik Tallir, Esen (BE); Lucas Deruyter, Hooglede-Gits (BE); Luiz Henrique Di Creddo Palharin, São Paulo (BR); Tim Passchyn, Sint-Michiels (BE); Dré W.J. Jongmans, AG Klundert (NL); Yuanyuan Li, Leuven (BE)

(73) Assignee: CNH Industrial America LLC, New Holland, PA (US)

( * ) Notice: Subject to any disclaimer, the term of this patent is extended or adjusted under 35 U.S.C. 154(b) by 863 days.

(21) Appl. No.: 17/835,416

(22) Filed: Jun. 8, 2022

(65) Prior Publication Data

US 2022/0394926 A1     Dec. 15, 2022

(30) Foreign Application Priority Data

Jun. 9, 2021  (EP) .................................... 21178632

(51) Int. Cl.
| | |
|---|---|
| *A01D 41/127* | (2006.01) |
| *A01D 41/12* | (2006.01) |
| *G01B 11/04* | (2006.01) |

(52) U.S. Cl.
CPC ..... *A01D 41/1277* (2013.01); *A01D 41/1243* (2013.01); *G01B 11/04* (2013.01)

(58) Field of Classification Search
None
See application file for complete search history.

(56) References Cited

U.S. PATENT DOCUMENTS

| | | |
|---|---|---|
| 6,119,442 A | 9/2000 | Hale |
| 7,877,969 B2 | 2/2011 | Behnke |

(Continued)

FOREIGN PATENT DOCUMENTS

| | | |
|---|---|---|
| DE | 102014204603 B3 | 7/2015 |
| DE | 102015216081 A1 | 3/2016 |

(Continued)

OTHER PUBLICATIONS

Extended European Search Report for European Application No. 211 786 32.2, dated Dec. 1, 2021, 7 pages.

(Continued)

*Primary Examiner* — Christian Chace
*Assistant Examiner* — Shayne M. Gilbertson
(74) *Attorney, Agent, or Firm* — Buchanan Ingersoll & Rooney PC (57) ABSTRACT

A method is provided for controlling a threshing system for an agricultural harvester. The method includes using a camera for obtaining images of a crop flow, processing the obtained images and controlling an operational setting of the threshing system. The images are obtained downstream of the threshing system, preferably somewhere between the threshing rotor or threshing drum and the residue spreader. The image processing aims at detecting grain ears in the obtained images, and to derive from those images at least one physical property of the detected grain ears. The operational setting of the threshing system are controlled in dependence of the derived at least one physical property.

19 Claims, 6 Drawing Sheets

(56) References Cited

U.S. PATENT DOCUMENTS

| | | | |
|---|---|---|---|
| 9,600,872 | B2 | 3/2017 | Dima |
| 9,934,538 | B2 | 4/2018 | Hunt |
| 2012/0123650 | A1 | 5/2012 | Diekhans et al. |
| 2016/0286722 | A1* | 10/2016 | Heitmann ............ G05B 13/021 |
| 2017/0055445 | A1* | 3/2017 | Mahieu ................. A01F 12/40 |
| 2017/0235471 | A1* | 8/2017 | Schøler ................. G01F 1/666 |
| | | | 715/772 |
| 2018/0035609 | A1 | 2/2018 | Barbi |
| 2019/0274254 | A1* | 9/2019 | Banks, Jr. ............... A01F 12/18 |
| 2021/0015039 | A1 | 1/2021 | Vandike et al. |
| 2021/0084816 | A1* | 3/2021 | Bussmann ............. A01F 12/58 |
| 2022/0132736 | A1* | 5/2022 | Meyers ............. A01D 41/1277 |
| | | | 460/7 |
| 2023/0012175 | A1* | 1/2023 | Edo ........................ G06V 10/82 |

FOREIGN PATENT DOCUMENTS

| | | |
|---|---|---|
| EP | 1763988 A1 | 3/2007 |
| EP | 2452550 A1 | 5/2012 |
| EP | 3138383 A1 | 3/2017 |
| WO | 2018089774 A1 | 5/2018 |

OTHER PUBLICATIONS

Steponavičius et al., "138. Analysis of corn ears movement within the threshing crescent using high-speed recording method", Journal of Measurements in Engineering, Dec. 2017, vol. 5, Iss. 4, pp. 240-248.

* cited by examiner

THRESHING CONTROL SYSTEM

CROSS-REFERENCE TO RELATED APPLICATION

This application claims priority to European Patent Application No. 21178632.2, filed Jun. 9, 2021, the content of such application being incorporated by reference herein in its entirety.

TECHNICAL FIELD

The present invention relates to method for controlling a threshing system for an agricultural harvester

BACKGROUND

An agricultural harvester such as a combine harvester or 'combine' performs multiple harvesting functions with a single harvesting unit, such as picking, threshing, separating and cleaning. A combine includes a header, which removes the crop from a field, and a feeder housing which transports the crop matter into a threshing and separating system. Threshing system includes one or more rotors or drums which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly or arrangement and discharged back to the field using a spreader system. The separated grain, together with some finer non-grain crop material such as chaff, dust, straw, and other crop residue are discharged through the concaves and fall onto a grain pan where they are transported onto the sieves of a cleaning system. Alternatively, the grain and finer non-grain crop material may also fall directly onto the cleaning system itself.

A cleaning fan blows air through the sieves of the cleaning system to discharge chaff and other debris toward the rear of the combine while the grain falls through the sieves. Non-grain crop material such as straw from the threshing section proceeds through a residue system, which may utilise a straw chopper to process the non-grain material and direct it out the rear of the combine. From the cleaning system, the cleaned grain is transported to a grain tank on-board the combine. When the grain tank becomes full, the combine is positioned adjacent to a vehicle into which the grain is to be unloaded, such as a semi-trailer, straight truck, or the like; and an unloading system on the combine is actuated to transfer the grain into the vehicle.

A key objective of the operation of all combine systems is to retrieve as much grain as possible from the crop that is taken from the field. For example, sieve openings and a fan speed of the cleaning system are continuously adapted to ensure that as much as possible grain sent to the grain tank, while all the chaff and other light non-grain material is thrown back onto the field. Impact sensors are provided at the rear end of the sieves to detect grain loss and are used as input for a control system that aims to optimize the operational settings of the cleaning system. It is known to use similar impact sensors, directly downstream of the threshing system in order to detect grain loss. However, the much higher volume and bigger pieces of non-grain crop material that leave the threshing system make such impact sensors far less reliable than when used behind the cleaning system.

In US patent application U.S. Pat. No. 6,119,442 A an instrument and control system is disclosed, which monitors conditions of processing of the crop materials and automatically adjusts settings of the combine in response to the monitored conditions. The system described uses multiple image sensors, one of which is located near the outlet end of the thresher system. This image device is used to distinguish kernels of loose grain within the image and to quantify their presence in terms of grain loss in the threshing section. From an excessive presence of loose grain kernels at this point in the crop flow, it is concluded that threshing action was aggressive enough to detach grain from other crop materials, but that the grain did not pass through concave apertures or grate apertures, typically due to excessive vegetative material covering too many of apertures and; i.e., overloading of thresher. To avoid further grain loss in the threshing system, the control system is programmed to reduce the ground speed of the combine, and thereby to cause a reduction in the loading of threshing system.

Although this image based monitoring of grain immediately behind the threshing system, as described in 1999, may be useful in theory, it has not yet been put into practice. One of its main practical problems is that, as for the impact sensors already discussed above, it is difficult to recognize the small grain kernels in the presence of a high volume of much bigger pieces of non-grain crop material. Further, although this system can provide some information about how well grain kernels are able to fall through the threshing concaves, it does not provide any useful information about the quality of the threshing itself.

It is an aim of the present invention to address one or more disadvantages associated with the prior art.

SUMMARY OF THE INVENTION

According to an aspect of the invention there is provided a method for controlling a threshing system for an agricultural harvester, such as a combine harvester. The method comprises using a camera for obtaining images of a crop flow, processing the obtained images and controlling an operational setting of the threshing system. The images are obtained downstream of the threshing system, preferably somewhere between the threshing rotor or threshing drum and the residue spreader. The image processing aims at detecting grain ears in the obtained images, and to derive from those images at least one physical property of the detected grain ears. The operational setting of the threshing system are controlled in dependence of the derived at least one physical property.

By looking at the derivable physical properties of the grain ears (depending on the crop type, also called cobs, pods or heads), the harvester control systems obtain direct information about the effectiveness of the threshing operation. Useful physical properties that may be derived from the obtained images are, e.g., an indication of whether the detected ears are threshed, unthreshed or partially unthreshed. The image processing algorithms may count a number of kernels that are still attached to the ear, or calculate a ratio of its unthreshed/threshed portion relative to the total portion of the ear (in length or surface area). The status of the detected grain ear might be determined as threshed, partially unthreshed or unthreshed if the ratio of the surface still covered with grain kernels over the total surface in the obtained image of the detected grain ear is respectively smaller than 10%, between 10 and 90%, greater than 90%. The amount of unthreshed or partially unthreshed ears may, e.g., be counted per image, per group of, e.g., 10 or 100 images, or over a predetermined time span. Instead of an amount, a percentage of unthreshed and/or partially threshed grain ears may be determined.

As the inventors observed, a high amount of unthreshed or partially unthreshed ears found in the obtained images, detectable using the method according to the invention, turns out to be a good indication of the threshing process not being aggressive enough. It has been found that highly reliable estimates of such amounts can be obtained, especially when harvesting large grain crops, such as corn, sunflowers, soy beans and other beans.

Another physical property of the grain ears that may be derived from the obtained images is a dimensional characteristic of the detected grain ears, such as its shape, length or width. When the threshing system is too aggressive, it does not only separate the grain kernels from the ears, but it may break the grain kernels too, as well as the ears. In addition thereto, more aggressive threshing leads to higher power consumption and more wear to machine.

Broken ears are generally different in shape, length and or width from non-broken ears. According to embodiments of the invention, overaggressive threshing can be detected by analyzing such dimensional characteristics of the detected grain ears. The operational settings of the threshing system may then be controlled in dependence of, e.g., a length distribution of the detected grain ears. The length or length distribution of the detected grain ears may be compared to a known common length or length distribution of the particular crop or crop variety that is being harvested. Alternatively, the grain ear length or length distribution may be compared to predetermined user defined values or data retrieved from a previous harvest or a different part of the same field. Ear widths may be processed in a similar way. Even better results may be obtained by analyzing both the lengths and the width of the detected ears. Detected shapes of detected ears may, e.g., be taken into account by classifying each detected ear into one of a number of distinct predetermined shape categories. A measured distribution of ear counts in the different categories can then be used to estimate an amount or percentage of broken ears.

Operational settings that may be adjusted in dependence of the derived physical properties of the detected grain ears are, e.g., a concave clearance between an outer radius of a threshing rotor or threshing drum and an inner surface of an opposing threshing concave, a concave opening of the threshing concave, a rotational speed of a threshing rotor or threshing drum, an orientation of rotor vanes in a rotor cage above the rotor, an orientation of threshing elements on the rotor or the configuration of elements of the rotor concave. With such adjustments, the threshing process can be adjusted to increase or reduce the threshing intensity in order to prevent grain loss as well as broken grains, while reducing the harvester's power consumption.

According to a further aspect of the invention, a threshing system for an agricultural harvester is provided. The threshing system comprises at least one threshing rotor or threshing drum, a thresher camera and a controller. The at least one threshing rotor or threshing drum is cooperatively arranged in parallel to an opposing threshing concave. The thresher camera is arranged for obtaining images of a crop flow, downstream of the at least one threshing rotor or threshing drum. The controller is operatively coupled to the thresher camera and configured to receive the obtained images from the thresher camera, to process the images to detect grain ears therein, and to derive therefrom at least one physical property of the detected grain ears. The controller is further configured to control an operational setting of the threshing system in dependence of the derived at least one physical property.

According to yet another aspect of the invention, an agricultural harvester with such a threshing system is provided. The agricultural harvester, which may be a combine harvester, further comprises a residue chopper for chopping crop residue received from the threshing system and a chopper camera for monitoring chopped crop residue leaving the residue chopper. The chopper camera and the thresher camera may share a common housing, the common housing being installed such that a crop residue stream coming from the threshing system and bypassing the residue chopper passes a field of view of the thresher camera. Such a dual-view camera brings the advantage that it can be installed without much additional effort. In many combine harvesters, the user can choose to operate the harvester in a chopping mode or a no-chopping mode. Often, a separate route, bypassing the chopper, is provided for the crop residue when operating in the no-chopping mode. By installing the common housing in a position between the respective crop flow paths for the different modes of operation, only one camera housing needs to be installed and the harvester's monitoring and control system can easily switch between the two modes.

Alternatively, the thresher camera is movably mounted such that is operable in a chopper mode for monitoring chopped crop residue leaving the residue chopper or in a thresher mode wherein a crop residue stream coming from the threshing system and bypassing the residue chopper passes a field of view of the thresher camera. In such an embodiment, there is still only one camera housing that needs to be installed and costs may be reduced because only one camera is needed instead of two. The moving of the camera between its chopper mode and thresher mode position and/or orientation may, e.g., involve a rotation and/or sliding movement of the camera and its housing, or a detachment from a first mounting position followed by a re-attachment to a second mounting position. Optionally, a camera actuator is provided, configured to move the thresher camera between a chopper mode and a thresher mode position and/or orientation.

In other agricultural harvesters, the crop residue stream follows the same path in the chopping and no-chopping modes. In the no-chopping mode, a counter knife or a plurality of counter knives is retracted and the residues crop moves through the chopper without being chopped. In such harvesters the same camera can be used for monitoring the chopping quality while in chopping mode and monitoring the threshing quality when in no-chopping mode.

BRIEF DESCRIPTION OF THE DRAWINGS

Embodiments of the invention will now be described by way of example with reference to the accompanying drawings, in which.

DETAILED DESCRIPTION

Figure 1:
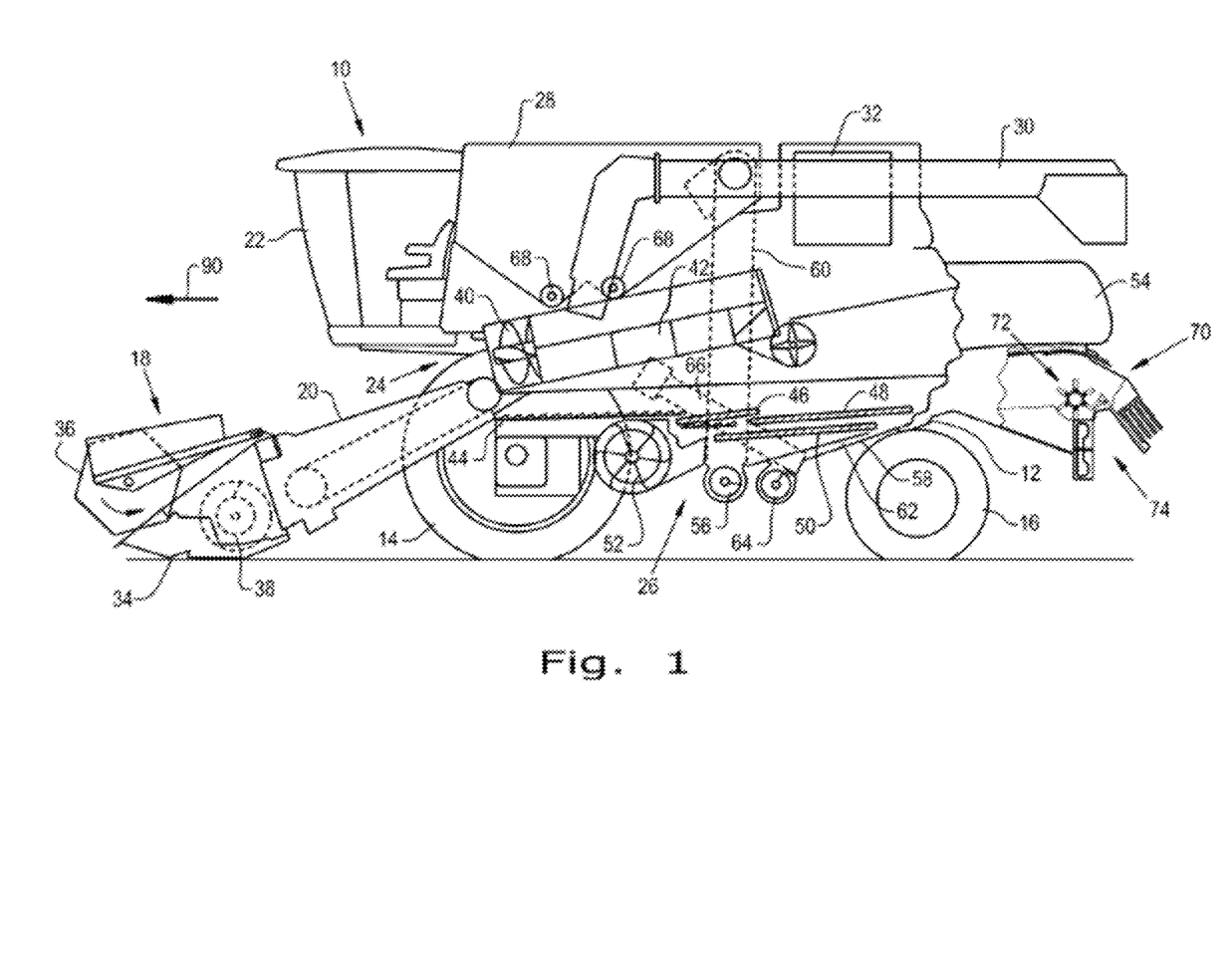
FIG. 1 schematically shows a combine harvester in which the invention may be advantageously used.

FIG. 1 shows an agricultural harvester in the form of a combine 10, which includes a chassis 12, ground engaging wheels 14, 16, a header 18, a feeder housing 20, an operator cab 22, a threshing and separating system or assembly 24, a cleaning system 26, a grain tank 28, and an unloading tube or conveyor 30. Unloading conveyor 30 is illustrated as an unloading auger, but can also be configured as a belt conveyor, chain elevator, etc.

The front wheels 14 are large flotation-type wheels, and the rear wheels 16 are smaller steerable wheels. Motive force is selectively applied to the front wheels 14 through a power source in the form of a diesel engine 32 and a transmission (not shown). Although the combine 10 is shown as including wheels, the combine may include tracks, as in a full tracks or half-tracks vehicle.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable inside a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. It is noted that, although the embodiment shown here uses a threshing rotor 40, the invention is equally applicable to so-called conventional combine harvesters using transversally installed threshing drums, or hybrid combine harvesters using a combination of threshing drums and rotors.

Grain that has been separated by the threshing and separating system 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48, 50 is subjected to a cleaning action by the fan, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-aft direction to transport the grain and finer non-grain crop material to the upper surface of the upper sieve 48. The upper sieve 48 and the lower sieve 50 are vertically arranged relative to each other, and likewise oscillate in a fore-aft direction to spread the grain across the sieves 48, 50 while permitting the passage of cleaned grain by gravity through the openings of the sieves 48, 50.

Clean grain falls to a clean grain auger 56 positioned crosswise below and in front of the lower sieve 50. The clean grain auger 50 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

A residue handling system 70 is integrated in the rear of the combine 10. More specifically, in the described example a chopper arrangement 72 of the residue handling system 70 is mounted to a straw hood 54 of the combine 10, and is located above a vertically-oriented straw and chaff spreader 74. It is noted that the residue handling system can be located at different positions within the combine, but is positioned such that it can receive material other than grain (MOG) after grain has been removed by the threshing and separating system. The residue spreader 74 can receive two streams of crop residue: one stream from the straw chopper 72 and one stream from the cleaning system 26. The residue spreader 74 discharges the non-grain crop material or residue across the harvested width behind the combine 10. A door can be located above the chopper 72 which can move to either divert residue to the chopper 72 and then to the spreader 74, or divert residue over the chopper 72 to the spreader 74 without chopping.

Figure 2:
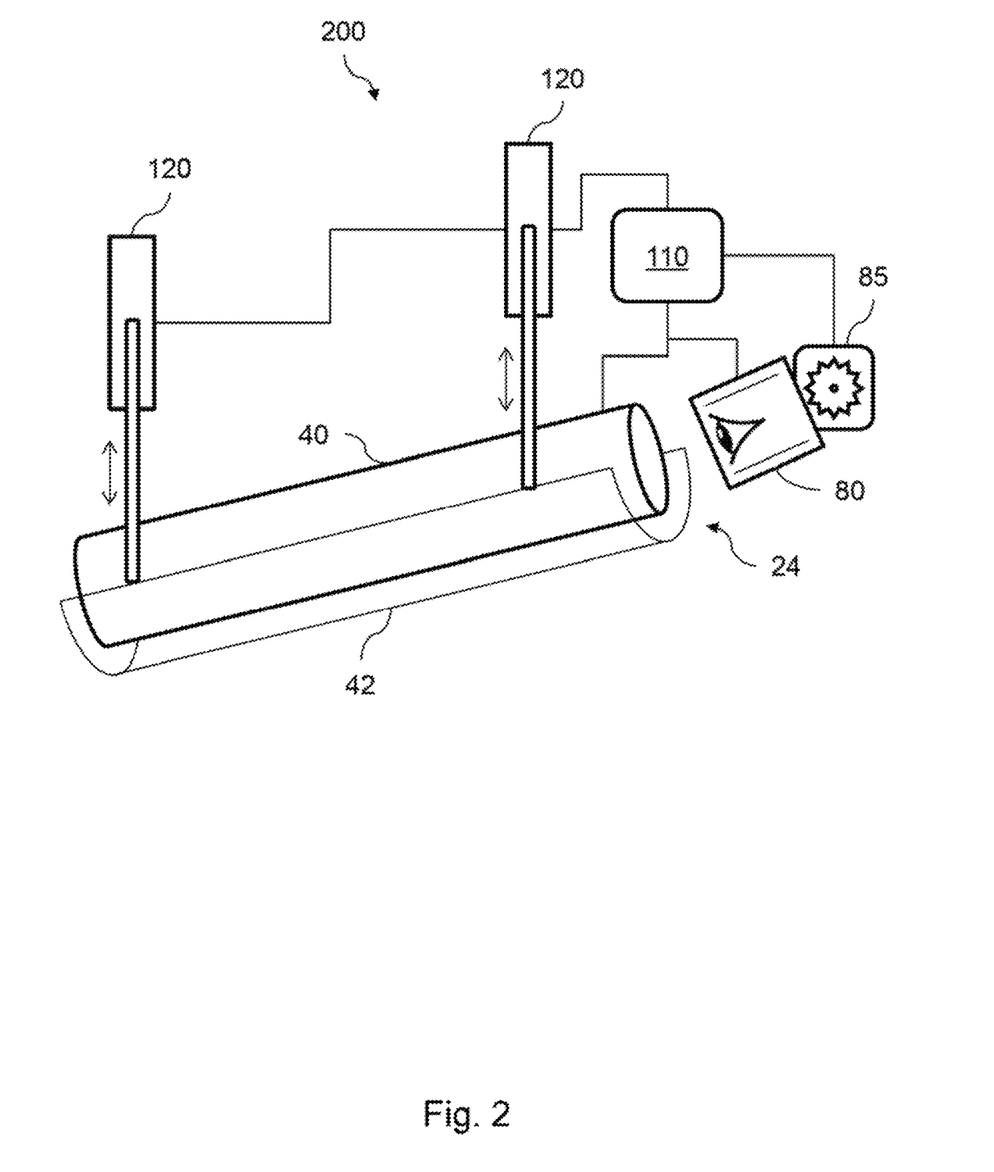
FIG. 2 schematically shows a threshing control system according to an embodiment of the invention.

FIG. 2 schematically shows a threshing control system 200 according to an embodiment of the invention. The control system comprises controller 110 that is coupled to a camera 80 for receiving images of a crop flow therefrom. The images are obtained downstream of the threshing system 24. The threshing system 24 shown here has a single threshing rotor 40 and is partially enclosed by and rotatable inside a corresponding semi-circular perforated concave 42. In addition thereto, the rotor 40 may be covered by semi-circular rotor cover (not shown) that may include rotor vanes for guiding the crop material while spiraling its way (from left to right) through the small gap between the threshing rotor 40 and the threshing concave 42. It is noted that although a single threshing rotor 40 is shown, the combine 10 may use multiple rotors 40 and the invention is equally applicable to so-called conventional combine harvesters using transversally installed threshing drums, or hybrid combine harvesters using a combination of threshing drums and rotors.

The camera 80 is installed downstream the rotor 40, preferably somewhere between the threshing rotor 40 and the residue spreader 74, such that it can get a good view of the crop material after having passed the threshing rotor 40. As will be explained in more detail below with reference to FIGS. 5a and 5b, the camera 80 may be adjustable in position and/or orientation by an actuator 85.

The threshing intensity depends on a number of different aspects, such as the size of the clearance between the rotor 40 and the concave 42, the geometry of the threshing elements on the rotor surface, the geometry of the concave grating, a rotational speed of the rotor 40 and a geometry and orientation of the rotor vanes attached to the inside of the rotor covers (if any). Although many of these operational parameters of the threshing system are adjustable while harvesting, FIG. 2 only shows two actuators 120 for together adjusting the clearance between the rotor 40 and the concave 42, but additional actuators may be provided for adjusting, e.g., rotor vanes and concave gratings. The drive mechanism for the rotor 40 may include a variator for adjusting the rotational speed. All such adjustments are controlled by the controller 110, which may be part of a larger combine harvester control system. Further, adjusting the threshing intensity may be done in different ways. Depending on the situation, as defined by the multiple input signals, the controller 110 may, e.g., decide to adjust the clearance between the rotor 40 and the concave 42, the rotor speed or both.

Figure 3:
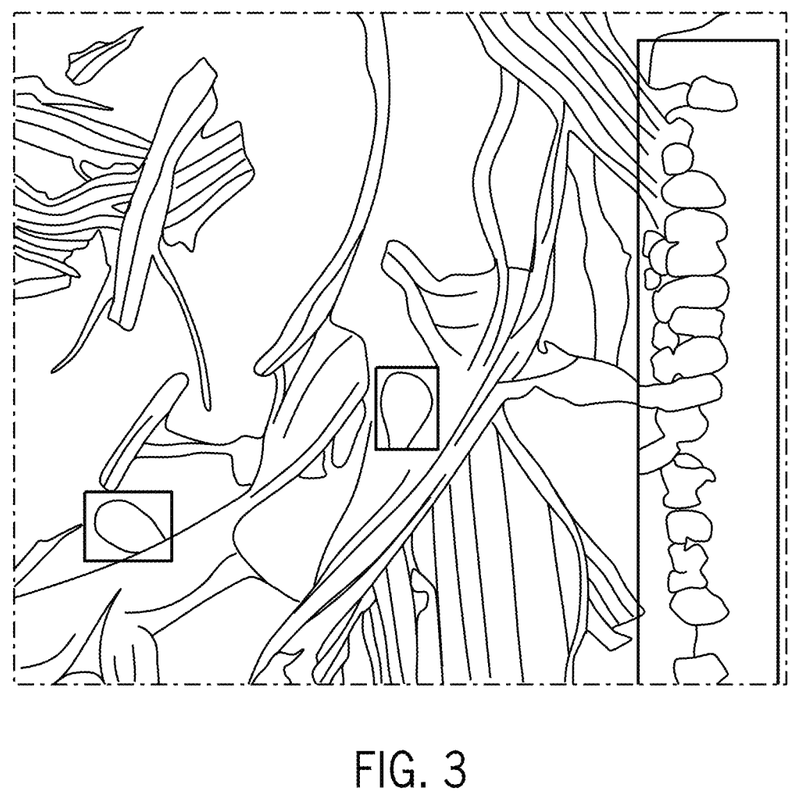
FIG. 3 shows an example of an image as it may be obtained by the camera of the threshing control system.

As the inventors observed, a high amount of unthreshed or partially unthreshed ears found in the obtained images turns out to be a good indication of the threshing process not being aggressive enough. It has been found that highly reliable estimates of such amounts can be obtained, especially when harvesting large grain crops, such as corn, sunflowers, soy beans and other beans. FIG. 3 shows an example of an image as it may be obtained by the camera 80 of the threshing control system 200. The image has been obtained by the camera, while harvesting corn. An advantage of corn is that both corn cobs and corn kernels are relatively big and are quite well distinguishable from straw leaves and other crop material in the crop residue stream coming from the rotor.

As can be seen at the right side of this image, this image shows an unthreshed corn cob. With well adapted and classic image recognition algorithms, it is possible to detect the unthreshed ears and distinguish them from fully or partially unthreshed ears. Additionally, it is possible to count the number of grain kernels still attached to the cob. Optionally, the amount of attached grain kernels is related to a detected length of the cob. Such information may, e.g., be used to distinguish different categories of partially unthreshed ears. Alternatively, each detected ear is assigned a threshing score between 0 for completely threshed and 1 for completely unthreshed. With well-trained machine learning algorithms, even better results may be obtained. The amount of unthreshed or partially unthreshed ears may, e.g., be counted per image, per group of, e.g., 10 or 100 images, or over a predetermined time span. Instead of an amount, a percentage of unthreshed and/or partially threshed grain ears may be determined.

Based on, e.g., a number or percentage of (partially) unthreshed ears, the controller may decide that the amount of lost grain is too high and more aggressive threshing is needed. This may, e.g., be done by reducing the clearance between the threshing rotor 40 and the concave 42. Other inputs, like user preferences, crop type and power consumption may also be taken into account when deciding if more aggressive threshing is needed.

Another physical property of the grain ears that may be derived from the obtained images is the length or diameter of the detected grain ears. When the threshing system 24 is too aggressive, it does not only separate the grain kernels from the ears, but it may break the grain kernels too, as well as the ears. In addition thereto, more aggressive threshing leads to higher power consumption and more wear to the machine. When possible, it thus is desirable to reduce the threshing intensity. According to embodiments of the invention, overaggressive threshing can be detected by analyzing the length of the detected grain ears. The operational settings of the threshing system 24 may then be controlled in dependence of, e.g., a length distribution of the detected grain ears. The length or length distribution of the detected grain ears may be compared to a known common length or length distribution of the particular crop or crop variety that is being harvested. Alternatively, the grain ear length or length distribution may be compared to predetermined user defined values or data retrieved from a previous harvest or a different part of the same field. Measurements of the diameter of the detected grain ears may be used as an input for adjusting the concave opening, i.e. the diameter of the perforations in the threshing concave 42, to ensure that threshed or unthreshed grain ears will not enter the cleaning below the threshing concave 42.

A further relevant physical property of the detected grain ears that may be derived from the obtained images is the color of the grain ears. Not all different types of grain ears are equally prone to breaking. E.g. the cobs of corn varieties with white cobs tend to break much easier than corn varieties with red cobs. The control system may thus be configured to take into account the color of the grain ears when deciding how to react to a certain amount of detected broken cobs. Green bean pods may indicate that the pods have not yet been threshed. Even though the actual beans may not be detectable in the obtained image, the detected color of the bean pods may serve as an indication that the threshing intensity needs to be increased.

It is noted that broken grain ears and unthreshed ears may occur simultaneously. The controller 110 may use multiple inputs and sophisticated algorithms to decide whether to increase or decrease the threshing intensity. The threshing intensity can be adapted in a number of different ways, all with slightly different effects on the threshing process. For example, threshing intensity can be increased by increasing the rotational speed of the threshing rotor 40 or threshing drum, by reducing the concave clearance or by adjusting a configuration and/or orientation of rotor vanes, threshing elements on the threshing rotor 40, or an adjustable grating in the threshing concave 42. Also, the ground speed of the harvester 10 affects the threshing process and the threshing intensity by determining the amount of crop that is fed through the threshing system in a given time span. When the threshing intensity needs to be adjusted, the controller 110 will determine the most appropriate way to do so, based on not only the derived physical properties of the detected grain ears, but also based on information from other control systems of the harvester 10. In some situations, it may be preferred to adjust the threshing system 24, while keeping the threshing intensity at substantially the same level. For example, the concave openings may be partially closed to avoid broken ears to enter the cleaning system. While partially closing the concave openings would normally increase the threshing intensity, this could be compensated by slightly increasing the gap between the rotor 40 and the concave 42.

Figure 6A:
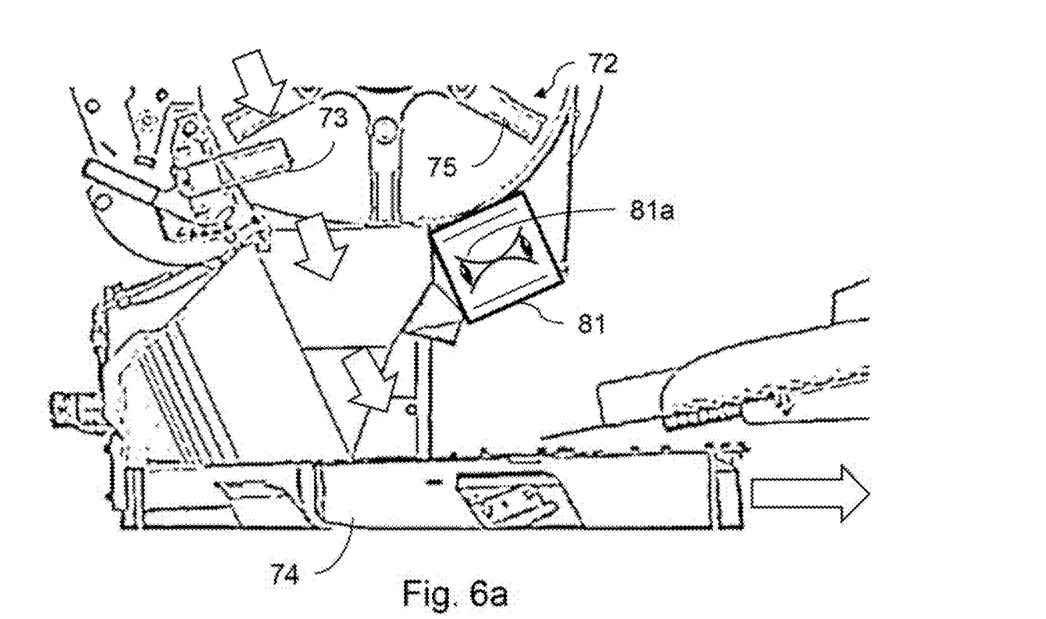
FIGS. 6a and 6b schematically show part of a cross section of a chopper and spreader assembly with a different camera for use with the invention.
Figure 6B:
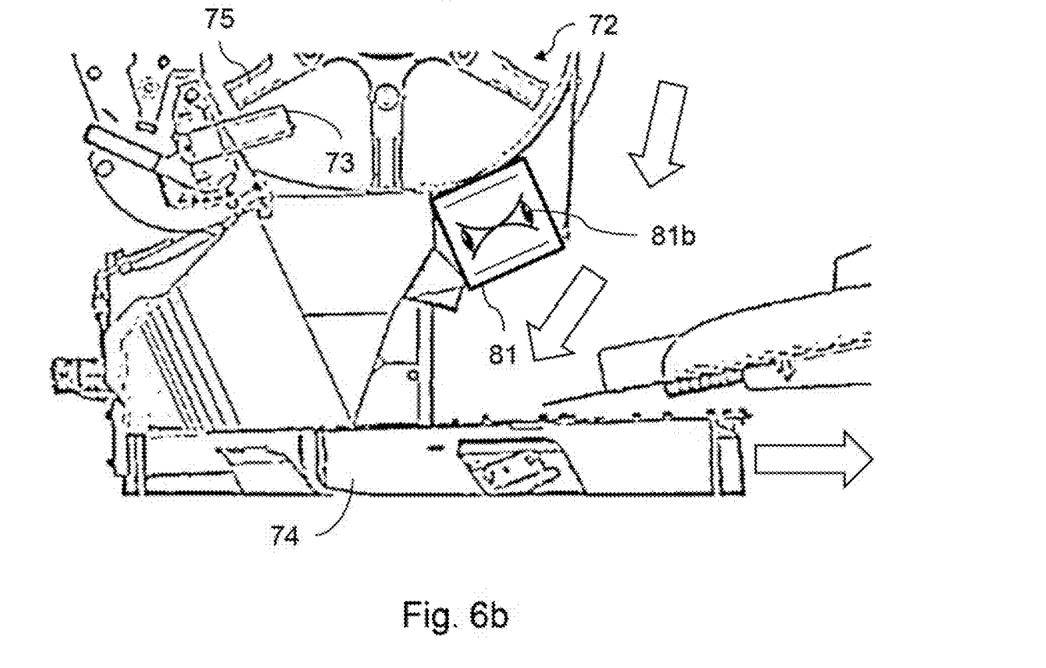

FIG. 6 schematically shows part of an exemplary combine harvesters 10 according to the invention. Shown in this figure are a chopper assembly 72 with a plurality of rotating flailing knives 75 and a bar of stationary counter knives 73. When harvesting large grain crops, such as corn, sunflowers, soy beans and other beans, the crop residue is not always chopped before it is thrown back onto the field. For, e.g., corn it is very common not to do so. When the chopper 72 is not used, the crop residue coming from the threshing system 24 is either dropped on the field, directly behind the combine 10, or spread over a wider area by the spreaders 74. The combine 10 may be switched to this no-chopping mode by simply retracting the counter knives 73. The crop residue will then move through the chopper assembly 72 without being chopped and the camera 80 can be used for controlling the threshing process in accordance with the invention.

Figure 5A:
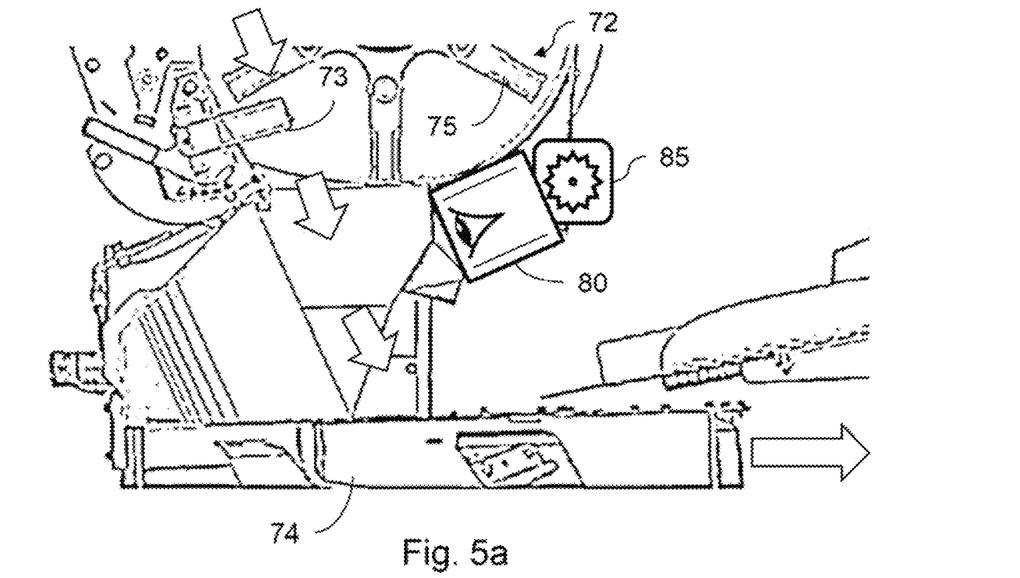
FIGS. 5a and 5b schematically show part of a cross section of a chopper and spreader assembly with a camera for use with the invention.
Figure 5B:
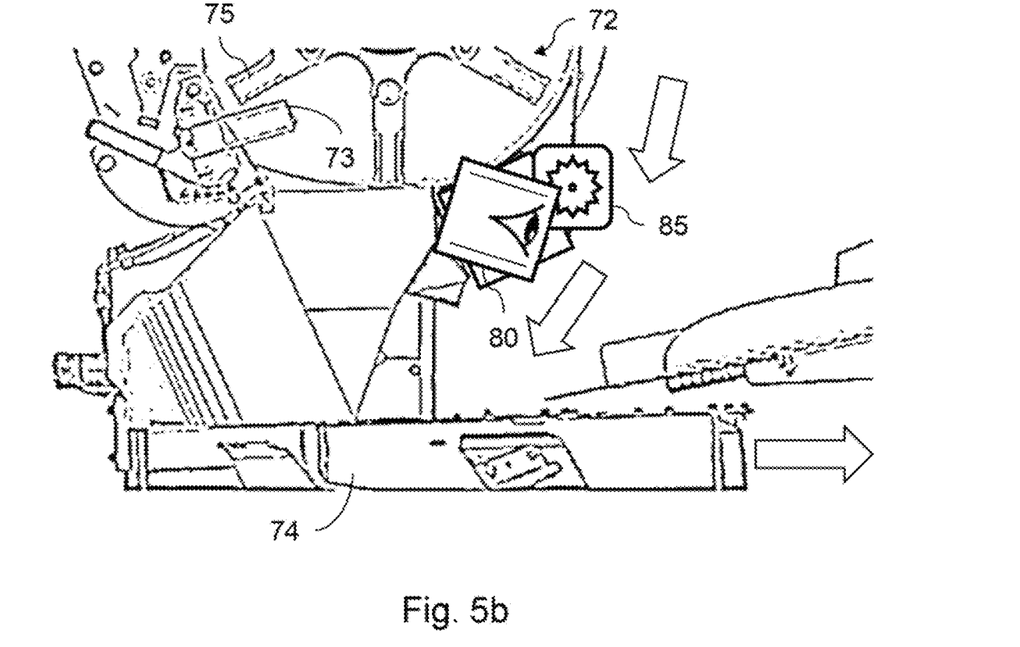

FIGS. 5*a* and 5*b* schematically show part of a cross section of a different chopper 72 and spreader 74 assembly with a camera 80 for use with the invention. In FIG. 5*a*, the combine harvester 10 is in chopping mode and the crop residue stream (indicated by the block arrows) moves through the chopper 72 towards the spreaders 74. In the chopper assembly 72, a plurality of rotating flailing knives 75 and a bar of stationary counter knives 73 together cut the crop residue into little pieces and project them into the spreaders 74 that spread the chopped residue over the field. A camera 80 may be used for monitoring the chopping process. For example, information on the length and color of the crop material leaving the chopper 72 may be used as input for a control algorithm that adjusts the chopper speed and knife bar position to obtain better chopping quality and/or lower power consumption.

In many combines 10, such as those shown in FIGS. 5a and 5b, the crop residue is guided along a different route to bypass the chopper 72 when operating in no-chopping mode. In FIG. 5b, this bypassing of the chopper 72 is indicated by the block arrows representing the crop residue flow in no-chopping mode. The camera 80, which in FIG. 5a was used for monitoring the chopping process, is now rotated to have view of the crop residue flowing from the threshing system 24 to the spreaders 74, past the chopper assembly 72. Such a rotation may be effected manually by the user or by an actuator 85 as shown in FIG. 5b. In alternative configurations, the camera 80 may have to be detached and reattached in a new position and/or orientation in order to switch between the suitable positions for monitoring the chopping or the threshing quality.

FIGS. 6a and 6b schematically show part of a cross section of a chopper 72 and spreader 74 assembly with a different camera 81 for use with the invention. The camera 81 is embodied as a single housing comprising two separate imaging devices, a chopper camera 81a and a thresher camera 81b. The camera is installed in such a way that the chopper camera 81a has a good view of the chopped crop residues ejected by the spreader 72, while the thresher camera 81b has a good view of the crop residue that passes the chopper assembly 72 and comes directly from the threshing system 24. Consequently, no mechanical adjustments are needed to switch between the chopping and the no-chopping mode.

Figure 4:
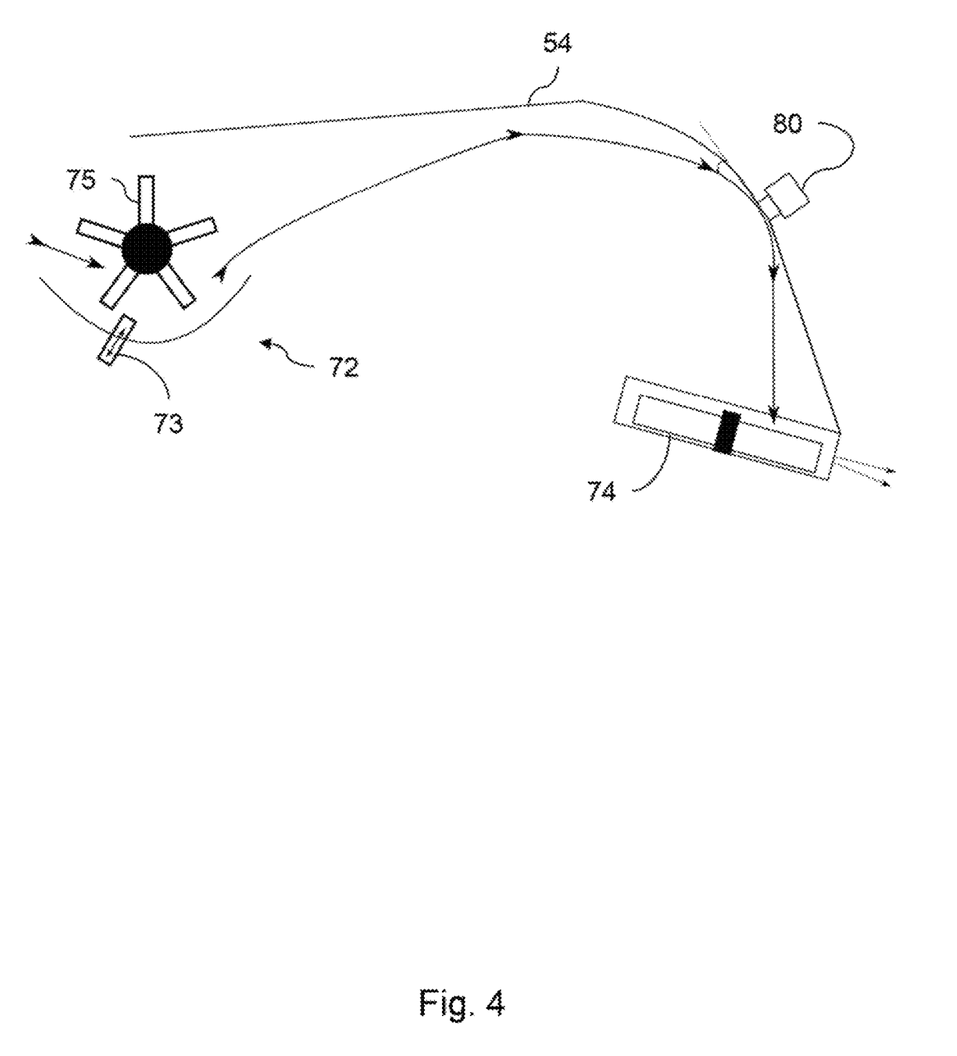
FIG. 4 schematically shows an embodiment of the invention.

In FIGS. 4 to 6, the camera 80, 81 is installed downstream the chopper 72. An advantage of installing the camera 80, 81 so far downstream the threshing rotor 40 is that the crop material mass may be less dense there, than when it just left the small gap between the rotor 40 and the concave, which will make it easier for the image recognition software to accurately and reliably detect all ears and all relevant physical properties of those ears.

It is however noted that, with the camera 80 in this position, it will be very difficult to detect any unthreshed ears when the combine harvester 10 is in chopping mode. This may not be considered a big problem if for the crops and crop varieties for which the current invention is expected to be most useful, the chopper 72 is generally not used.

However, the system described with reference to FIGS. 4 and 5 can easily be adapted to also work when in chopping mode, without departing from the scope of the invention, by moving the camera to a position upstream the chopper 72. For example, the camera may be placed near the chopper inlet, near the end of the threshing rotor 40, or close to the straw beater that is behind the rotor 40 and serves to move the crop material forward in the direction of the chopper 72.

What is claimed is:

1. A method for controlling an agricultural harvester having a threshing system including a threshing concave that at least partially surrounds either a threshing rotor or a threshing drum, the method comprising:

operating the threshing system so that crop material received from a feeder housing of the agricultural harvester is threshed causing smaller elements of the crop material to be discharged through perforations in the threshing concave while larger elements of the crop material are transferred by the threshing rotor or threshing drum towards a rear end of the agricultural harvester, using a camera that faces a rear end of the threshing rotor or threshing drum to obtain images of a crop flow at that location, processing the obtained images to detect grain ears therein, and deriving therefrom at least one physical property of the detected grain ears, and controlling an operational setting of the threshing system based on the derived at least one physical property, wherein the controlled operational setting is a concave clearance between an outer radius of the threshing rotor or threshing drum and an inner surface of the threshing concave, a concave opening of the threshing concave, and a rotational speed of the threshing rotor or threshing drum.

2. The method as claimed in claim 1, wherein the derived physical property is a threshed or partially unthreshed or unthreshed status of the detected grain ears.

3. The method as claimed in claim 2, whereby the status of the detected grain ear is determined as threshed, partially unthreshed or unthreshed if a ratio of the surface still covered with grain kernels over a total surface in the obtained image of the detected grain ear is smaller than 10%, between 10 and 90%, or greater than 90%, respectively.

4. The method as claimed in claim 2, wherein the operational setting of the threshing system is controlled of based on a determined percentage of unthreshed and/or partially threshed grain ears.

5. The method as claimed in claim 1, wherein the derived physical property is a dimensional characteristic of the detected grain ears.

6. The method as claimed in claim 5, wherein the operational setting of the threshing system is controlled based on a distribution of the dimensional characteristic of the detected grain ears.

7. The method as claimed in claim 1, wherein the derived physical property is a color of the detected grain ears.

8. The method as claimed in claim 1, wherein the controlled operational setting further includes a configuration of a rotor vane in a rotor cage above the threshing rotor or threshing drum.

9. The method as claimed in claim 1, wherein the derived physical property is a dimensional characteristic of the detected grain ears including a shape, length and/or width of the detected grain ears.

10. The method as claimed in claim 1, wherein the at least one derived physical property comprises a plurality of derived physical properties including: a threshed or partially unthreshed or unthreshed status of the detected grain ears, a dimensional characteristic of the detected grain ears, and a color of the detected grain ears, and wherein the operational setting of the threshing system is controlled based on the plurality of derived physical properties.

11. An agricultural harvester comprising:
a threshing system including at least one threshing rotor or threshing drum, cooperatively arranged in parallel to an opposing threshing concave, wherein the threshing rotor or the threshing drum in combination with the opposing threshing concave together configured to thresh crop material received from a feeder housing of the agricultural harvester causing smaller elements of the crop material to be discharged through perforations in the threshing concave while larger elements of the crop material are transferred by the threshing rotor towards a chopper for chopping the larger elements into smaller pieces, a camera positioned at a location that faces a rear end of the threshing rotor or the threshing drum for obtaining images of a crop flow at that location, a controller operatively coupled to the camera and configured that:

receives the obtained images from the camera, processes the images to detect grain ears therein, and derives therefrom at least one physical property of the detected grain ears, and controls an operational setting of the threshing system based on the derived at least one physical property, wherein the controlled operational setting is a concave clearance between an outer radius of the threshing rotor or threshing drum and an inner surface of the threshing concave, a concave opening of the threshing concave, and a rotational speed of the threshing rotor or threshing drum.

12. The agricultural harvester as claimed in claim 11, further comprising a mechanical actuator operatively coupled to the controller and adjusts the concave clearance.

13. The agricultural harvester as claimed in claim 11, further comprising a speed adjustor operatively coupled to the controller and adjusts the rotational speed of the threshing rotor or threshing drum.

14. The agricultural harvester as claimed in claim 11, wherein the at least one physical property of the detected grain ears is a dimensional characteristic or color of the detected grain ears.

15. An agricultural harvester comprising:

a threshing system including at least one threshing rotor or threshing drum, cooperatively arranged in parallel to an opposing threshing concave, wherein the threshing rotor or the threshing drum in combination with the opposing threshing concave together thresh crop material received from a feeder housing causing smaller elements of the crop material to be discharged through perforations in the threshing concave while larger elements of the crop material are transferred by the threshing rotor towards a rear end of the agricultural harvester, a residue chopper positioned at the rear end, wherein in a chopper mode of the agricultural harvester the larger elements of the crop material are delivered to the chopper for chopping the larger elements of the crop material into smaller pieces, and wherein in a thresher mode of the agricultural harvester the larger elements of the crop material are guided along a bypass route that bypasses the residue chopper;

a camera assembly for obtaining images of a crop flow at a first location residing at an outlet of the chopper and a second location residing along said bypass route, a controller operatively coupled to the camera assembly that:

receives the obtained images from the camera assembly, processes the images to detect grain ears therein, and derives therefrom at least one physical property of the detected grain ears, and controls an operational setting of the threshing system based on the derived at least one physical property.

16. The agricultural harvester as claimed in claim 15, wherein the camera assembly is movably mounted such that it is movable between a first position to obtain images of the crop flow at the first location residing at the outlet of the chopper and a second position to obtain images of the crop flow at the second location residing along said bypass route.

17. The agricultural harvester as claimed in claim 16, further comprising a camera actuator that moves the camera assembly between the first and second positions.

18. The agricultural harvester as claimed in claim 15, wherein the camera assembly comprises a chopper camera and a thresher camera that are combined together in a common housing, the common housing being installed such that the chopper camera faces the first location and the thresher camera that faces the second location.

19. The agricultural harvester as claimed in claim 15, wherein the first and second locations are on opposing sides of the residue chopper.

* * * * *